(12) United States Patent  
Matsumoto et al.

(10) Patent No.: US 12,528,049 B2  
(45) Date of Patent: Jan. 20, 2026

(54) EXHAUST PURIFICATION DEVICE

(71) Applicant: Mazda Motor Corporation, Hiroshima (JP)

(72) Inventors: Yuki Matsumoto, Hiroshima (JP); Hiroshi Yamada, Hiroshima (JP); Nozomi Yasui, Hiroshima (JP); Koichiro Harada, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 19/049,278

(22) Filed: Feb. 10, 2025

(65) Prior Publication Data

US 2025/0269326 A1 Aug. 28, 2025

(30) Foreign Application Priority Data

Feb. 22, 2024 (JP) ................. 2024-025923

(51) Int. Cl.
| | |
|---|---|
| *B01D 53/94* | (2006.01) |
| *F01N 3/22* | (2006.01) |
| *F01N 3/30* | (2006.01) |
| *F01N 13/08* | (2010.01) |
| *F02D 41/02* | (2006.01) |

(52) U.S. Cl.
CPC ..... *B01D 53/9454* (2013.01); *B01D 53/9495* (2013.01); *F01N 3/225* (2013.01); *F01N 13/08* (2013.01); *B01D 2258/01* (2013.01); *F01N 3/22* (2013.01); *F01N 3/222* (2013.01); *F01N 3/30* (2013.01); *F01N 2610/085* (2013.01); *F01N 2900/1624* (2013.01); *F01N 2900/1804* (2013.01); *F02D 41/0295* (2013.01); *F02D 2200/0814* (2013.01)

(58) Field of Classification Search
CPC combination set(s) only.
See application file for complete search history.

(56) References Cited

U.S. PATENT DOCUMENTS 4,589,254 A * 5/1986 Kume ............... F01N 3/227  
                                                                 60/289  
5,675,968 A 10/1997 Katashiba et al.  
(Continued)

FOREIGN PATENT DOCUMENTS

| JP | 3053703 B2 | 6/2000 |
|---|---|---|
| JP | 2020060137 A | 4/2020 |

*Primary Examiner* — Binh Q Tran  
(74) *Attorney, Agent, or Firm* — Alleman Hall & Tuttle LLP

(57) ABSTRACT

An exhaust purification device includes: a filter including an oxygen storage capacity (OSC) material; a secondary air supply passage connected to the exhaust passage upstream of the filter; a secondary air control valve disposed in the secondary air supply passage and configured to provide periodicity to secondary air supplied to the secondary air supply passage; and an engine control unit (ECU), wherein the ECU controls the secondary air control valve so as to supply the secondary air with a predetermined frequency and a maximum amplitude of an oxygen concentration. The secondary air control valve is controlled so that when the frequency of the secondary air is fixed to a value of greater than 0 Hz and less than or equal to 1.5 Hz, the maximum amplitude of the oxygen concentration is greater than 0.50% and less than or equal to 3.0%.

11 Claims, 5 Drawing Sheets

(56) References Cited

U.S. PATENT DOCUMENTS

| | | | |
|---|---|---|---|
| 2011/0072804 A1* | 3/2011 | Van Nieuwstadt | ........................... F02D 41/0055 60/287 |
| 2012/0216507 A1* | 8/2012 | Nieuwstadt | ........... F01N 13/009 60/274 |
| 2018/0094556 A1* | 4/2018 | Kurtz | ..................... F01N 3/027 |
| 2019/0345857 A1* | 11/2019 | Rollinger | .................. F01N 3/30 |
| 2019/0360416 A1* | 11/2019 | Nee | ..................... F01N 13/009 |
| 2020/0116092 A1 | 4/2020 | Nakagawa | |
| 2020/0271046 A1* | 8/2020 | Kelly | ..................... F02B 37/10 |
| 2021/0189941 A1* | 6/2021 | Riechert | .................. F01N 3/30 |

\* cited by examiner

EXHAUST PURIFICATION DEVICE

CROSS-REFERENCE TO RELATED APPLICATION

This application claims priority to Japanese Patent Application No. 2024-025923 filed on Feb. 22, 2024, the entire disclosure of which is incorporated by reference herein.

BACKGROUND

The technique disclosed herein relates to an exhaust purification device.

In order to prevent soot contained in exhaust gas from discharging outside, a filter for collecting the soot is disposed in an exhaust path of an internal combustion engine. A catalyst for burning and removing the soot is affixed to that filter.

Japanese Unexamined Patent Publication No. 2020-60137 discloses supplying secondary air upstream of the filter, thereby burning particulate substances on the filter. However, if the secondary air is merely continually supplied at the same rate, the temperature of the exhaust gas decreases, and thus the soot is not adequately burned up and removed from the filter.

The technique disclosed herein was made in view of the foregoing, and the object of the present disclosure is to appropriately supply $O_2$ to a filter in order to promote combustion of the soot.

SUMMARY

The inventors have conducted considerable research and have found that if the secondary air is supplied to the filter with a predetermined frequency and a predetermined maximum amplitude of an oxygen concentration, the filter temperature can be kept high and the combustion of soot can be promoted.

Specifically, the technique disclosed herein is directed to an exhaust purification device including:
- an exhaust passage attached to a combustion chamber of an engine;
- a filter which is disposed in the exhaust passage, which is capable of collecting fine particles in exhaust gas, and to which a catalyst including an oxygen storage capacity (OSC) material is affixed;
- a secondary air supply passage connected to the exhaust passage upstream of the filter;
- a secondary air supply device configured to supply the secondary air to the secondary air supply passage;
- a secondary air control valve disposed in the secondary air supply passage and configured to provide the secondary air with periodicity; and
- a controller electrically connected with the secondary air control valve, wherein the controller:
  - controls the secondary air control valve so as to supply the secondary air with a predetermined frequency and a predetermined maximum amplitude of an oxygen concentration, and
  - controls the secondary air control valve so that when the frequency of the secondary air is fixed to a value of greater than 0 Hz and less than or equal to 1.5 Hz, the maximum amplitude of the oxygen concentration is greater than 0.50% and less than or equal to 3.0%.

A catalyst used for purifying the exhaust gas contains an oxygen storage material (OSC material) with oxygen storage and release capacity. Such an exhaust purification catalyst generates adsorption heat by adsorbing $O_2$ if the air-fuel ratio of the exhaust gas is leaner than the stoichiometric air-fuel ratio, and generates oxidation heat by oxidizing HC and CO using the adsorbed $O_2$ if the air-fuel ratio of the exhaust gas is not lean. In this manner, the exhaust purification catalyst is characterized by repeating the adsorption reaction and the oxidation reaction depending on the lean state and the non-lean state. If the secondary air is steadily supplied to the exhaust purification catalyst, the exhaust purification catalyst is always lean. Thus, the cycle of the lean state and the non-lean state is not generated; the catalyst temperature is lowered; and the activity of the catalyst is lowered.

According to this configuration, the controller controls the secondary air control valve, thereby generating the periodic secondary air. The periodic secondary air enables generation of a cycle of the lean state and the non-lean state as described above. The catalyst affixed to the filter can maintain a high temperature and promote the combustion function because the periodic secondary air enables generation of a cycle of the adsorption heat and the oxidation heat.

Supplying the secondary air with the frequency and the maximum amplitude of the oxygen concentration as described above enhances the effect of purifying at least HC among the harmful components contained in the exhaust gas in the catalyst affixed to the filter. Specifically, the gas temperature at the inlet of the catalyst when the HC purification rate reaches 50% (T50 (HC)) can be lowered.

The secondary air control valve is preferably controlled so that when the frequency of the secondary air is fixed to a value of greater than 0 Hz and less than or equal to 0.5 Hz, the maximum amplitude of the oxygen concentration is greater than 0.50% and less than or equal to 3.0%.

The secondary air control valve is preferably controlled so that the maximum amplitude of the oxygen concentration of the secondary air is greater than 0.66% and less than or equal to 3.0%.

According to this configuration, it is possible to enhance the effect of purifying HC and CO among the harmful components contained in the exhaust gas in the catalyst affixed to the filter. Specifically, T50 (HC) can be lowered, and the gas temperature at the inlet of the catalyst when the CO purification rate reaches 50% (T50 (CO)) can also be lowered.

The secondary air control valve is preferably controlled so that the maximum amplitude of the oxygen concentration of the secondary air is greater than or equal to 0.78% and less than or equal to 1.8%.

According to this configuration, it is possible to further enhance the effect of purifying HC and CO among the harmful components contained in the exhaust gas in the catalyst affixed to the filter. Specifically, T50 (HC) and T50 (CO) can each be lowered by 5° C. or more.

An exhaust purification device according to another aspect may include:
- an exhaust passage attached to a combustion chamber of an engine;
- a filter which is disposed in the exhaust passage, which is capable of collecting fine particles in exhaust gas, and to which a catalyst including an OSC material is affixed;
- a secondary air supply passage connected to the exhaust passage upstream of the filter;
- a secondary air supply device configured to supply the secondary air to the secondary air supply passage;

a secondary air control valve disposed in the secondary air supply passage and configured to provide the secondary air with periodicity; and a controller electrically connected with the secondary air control valve, wherein the controller:

controls the secondary air control valve so as to supply the secondary air with a predetermined frequency and a predetermined maximum amplitude of an oxygen concentration, and controls the secondary air control valve so that when the maximum amplitude of the oxygen concentration of the secondary air is fixed to a value of greater than 0% and less than or equal to 3.0%, the frequency is greater than 0 Hz and less than or equal to 1.5 Hz.

According to this configuration, similarly to the above configuration, the controller controls the secondary air control valve, thereby generating the periodic secondary air. The periodic secondary air enables generation of a cycle of the lean state and the non-lean state. The catalyst affixed to the filter can maintain a high temperature and promote the combustion function because the periodic secondary air enables generation of a cycle of the adsorption heat and the oxidation heat.

Supplying the secondary air with the frequency and the maximum amplitude of the oxygen concentration as described above enhances the effect of purifying at least HC among the harmful components contained in the exhaust gas in the catalyst affixed to the filter. Specifically, T50 (HC) can be lowered.

The secondary air control valve is preferably controlled so that the frequency of the secondary air is greater than or equal to 0.20 Hz and less than or equal to 0.94 Hz, or greater than or equal to 1.2 Hz and less than or equal to 1.25 Hz.

According to this configuration, it is possible to further enhance the effect of purifying HC and CO among the harmful components contained in the exhaust gas in the catalyst affixed to the filter. Specifically, T50 (HC) can be lowered by 5° C. or more.

The secondary air control valve is more preferably controlled so that the frequency of the secondary air is greater than 0.25 Hz and less than 0.82 Hz.

According to this configuration, it is possible to enhance the effect of purifying HC and CO among the harmful components contained in the exhaust gas in the catalyst affixed to the filter. Specifically, T50 (HC) can be lowered by 5° C. or more, and T50 (CO) can also be lowered.

The exhaust purification device according to another aspect may further include:

a temperature detector configured to detect a temperature of the filter, wherein the controller:

is electrically connected to the temperature detector;

determines whether the temperature detected by the temperature detector is lower than or equal to a predetermined reference temperature; and controls the secondary air control valve to periodically supply the secondary air if the temperature detected by the temperature detector is lower than or equal to the reference temperature.

According to this configuration, the secondary air is periodically supplied if the temperature detected by the temperature detector is lower than or equal to the reference temperature, whereby a decrease in the activity due to a decrease in the catalyst temperature can be prevented.

The exhaust purification device according to another aspect may further include:

a three-way catalyst disposed in the exhaust passage, wherein the filter is disposed in the exhaust passage downstream of the three-way catalyst, and the secondary air supply passage is connected to the exhaust passage between the three-way catalyst and the filter.

The exhaust purification device according to another aspect may further include:

a fuel injection valve configured to supply fuel to the combustion chamber, wherein when controlling the secondary air control valve to supply the secondary air, the controller controls the fuel injection valve so that an air-fuel ratio in the combustion chamber is richer than a stoichiometric air-fuel ratio ($\lambda<1$, where $\lambda$ is the excess air ratio).

According to this configuration, when the temperature of the catalyst affixed to the filter is low, the valve is controlled so that the air-fuel ratio in the combustion chamber becomes richer than the stoichiometric air-fuel ratio, whereby the fuel flows from the combustion chamber into the exhaust path, and the fuel reacts with the three-way catalyst to raise the temperature, thereby raising the temperature of the filter as well. Then, supplying the periodical secondary air thereto enables further promotion of the combustion of soot in the filter.

As described above, the exhaust purification device disclosed herein supplies the filter with the secondary air with the predetermined frequency and the maximum amplitude of the oxygen concentration, whereby the filter temperature can be kept high and the combustion of soot can be promoted.

DETAILED DESCRIPTION

An embodiment of an engine system to which an exhaust purification device is applied will be described with reference to the drawings. The exhaust purification device described herein is an illustrative example.

Figure 1:
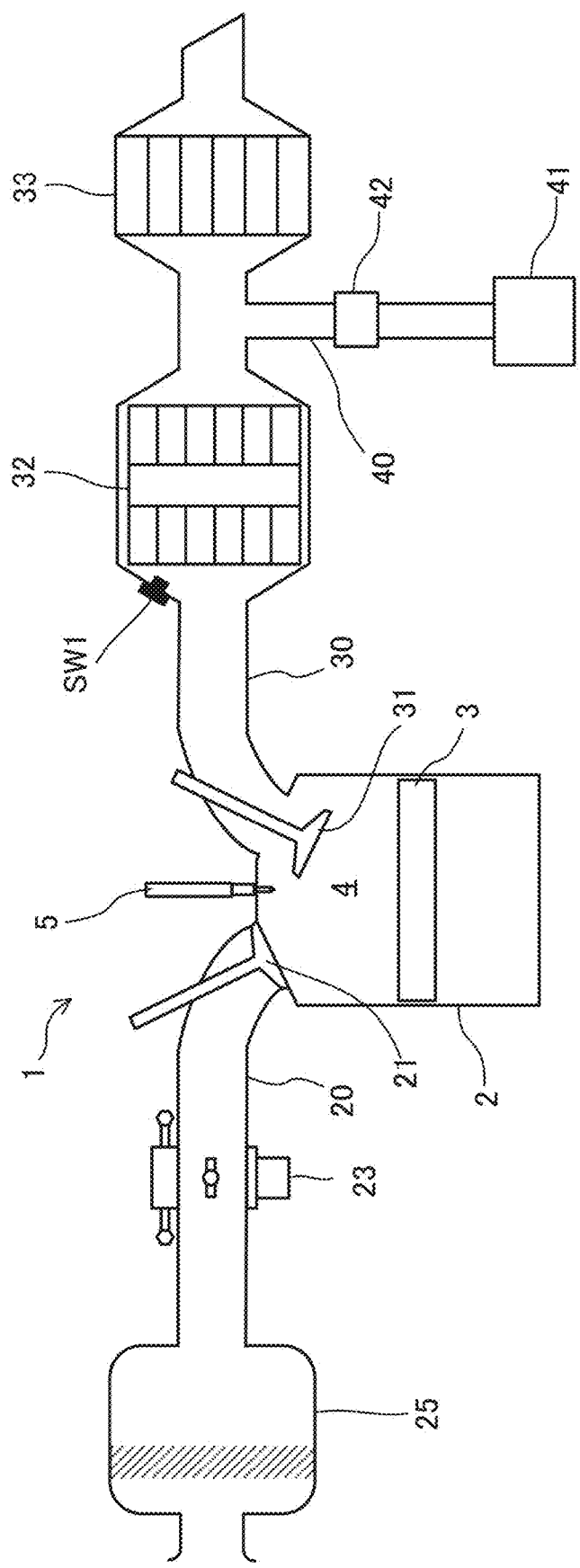
FIG. 1 shows an example of an exhaust purification device.
Figure 2:
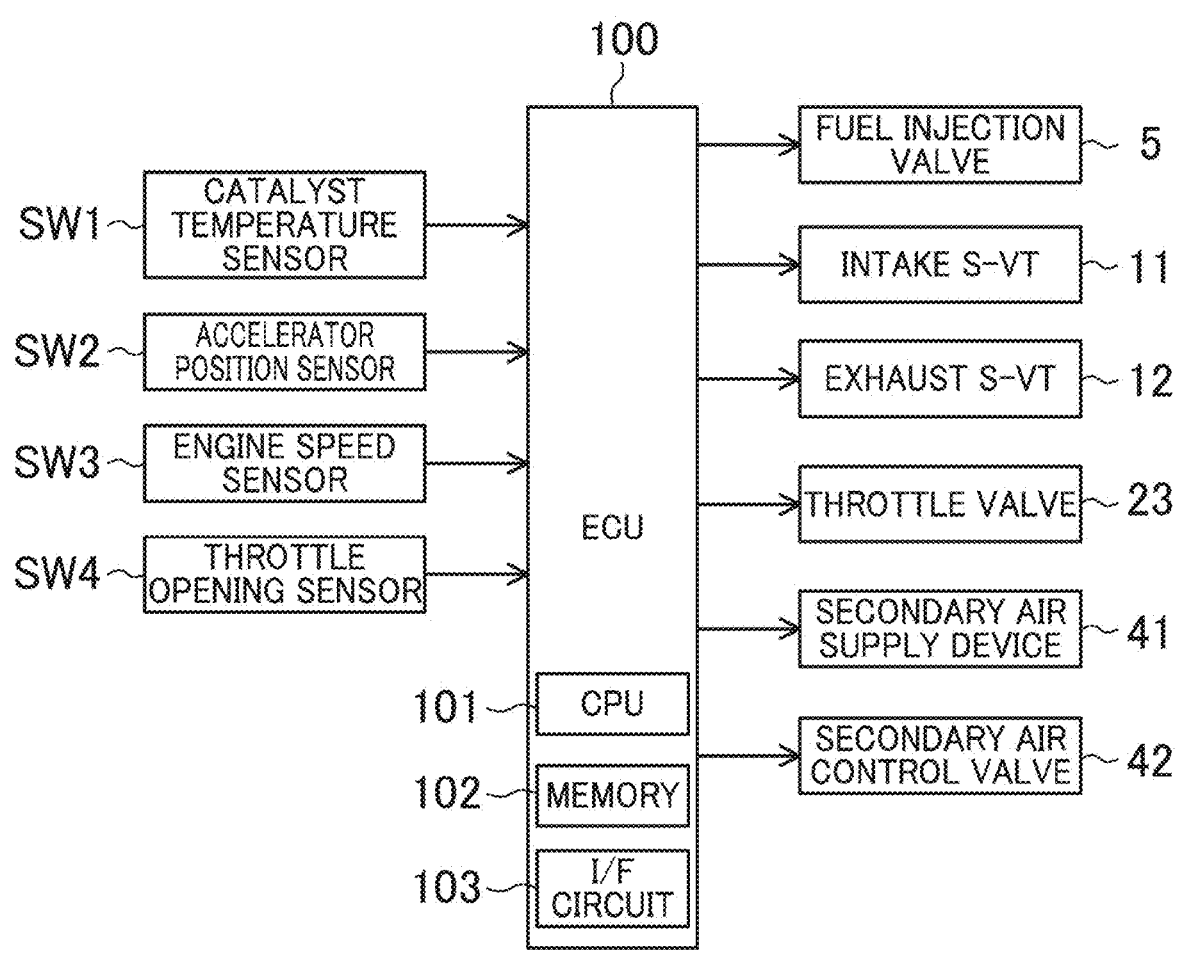
FIG. 2 is a block diagram of the exhaust purification device.

FIG. 1 is a schematic view illustrating an engine system to which an exhaust purification device is applied. FIG. 2 is a block diagram illustrating the engine system to which the exhaust purification device is applied.

The engine system includes an engine 1. The engine 1 is an internal combustion engine that burns fossil fuel, for example. The engine 1 may be an engine of any type or form, such as a spark-ignited engine, a compression ignition engine, and the like, but the technique disclosed herein is not limited to an engine of any particular type or form. The technique disclosed herein is not particularly limited to an engine 1 for a vehicle.

In this embodiment, the engine 1 is mounted on a four-wheel motor vehicle. The motor vehicle travels when the engine 1 operates. The fuel of the engine 1 is gasoline in this exemplary configuration.

(Engine Configuration)

The engine 1 includes a cylinder 2 and a piston 3 inserted into the cylinder 2. Combustion of an air-fuel mixture in a combustion chamber 4 of the cylinder 2 enables the piston 3 to reciprocate, where an intake stroke, a compression stroke, an expansion stroke, and an exhaust stroke are repeated in the cylinder 2. The engine 1 includes a fuel injection valve 5 for supplying fuel to the combustion chamber 4, and includes an intake passage 20 and an exhaust passage 30 both connected to the combustion chamber 4. The air supplied from the intake passage 20 is introduced into the combustion chamber 4 by an intake valve 21. The exhaust gas generated by the combustion of the air-fuel mixture in the combustion chamber 4 is discharged to the exhaust passage 30 by an exhaust valve 31.

Opening and closing of the intake valve 21 and the exhaust valve 31 are controlled by a valve controller. The valve controller controls opening and closing of the intake valve 21 or the exhaust valve 31, thereby adjusting the amount of air and the amount of burned gas introduced into the cylinder. When the fuel stops being supplied to the combustion chamber 4 at the time of deceleration of the engine described later, the valve controller closes at least one of the intake valve 21 or the exhaust valve 31. The valve controller is a variable valve mechanism for making the valve timing and/or the valve lift variable, and includes an electric or hydraulic intake sequential-valve timing (S-VT) 11 and an electric or hydraulic exhaust S-VT 12, for example, as shown in FIG. 2. The intake S-VT 11 and the exhaust S-VT 12 continuously change the rotational phase of an intake camshaft and the rotational phase of an exhaust camshaft, respectively, within a predetermined angular range.

A throttle valve 23 for adjusting the amount of intake air passing is disposed upstream of the intake passage 20, and an air cleaner 25 is disposed upstream of the throttle valve 23. The throttle valve 23 operates electrically based on a required amount of fuel injection according to the accelerator position of the driver and based on a command signal from an engine control unit (ECU) 100 described later. The opening degree of the throttle valve 23 is detected by a throttle opening sensor SW4. The air cleaner 25 filters air.

(Exhaust Purification Catalyst)

A three-way catalyst 32 for purifying the exhaust gas is disposed downstream of the exhaust passage 30. The three-way catalyst 32 is an exhaust purification catalyst that is activated at a predetermined temperature or higher, and that reduces and purifies mainly nitrogen oxides ($NO_x$) among harmful substances in the exhaust gas, and oxidizes and purifies mainly hydrocarbons (HC) and carbon monoxide (CO) among harmful substances in the exhaust gas. In detail, the three-way catalyst 32 consists of a cylindrical case in which a catalytic layer is formed, where the catalytic layer includes a catalyst support to which precious metal particles, such as rhodium (Rh), palladium (Pd), platinum (Pt), and the like, and an oxygen storage capacity (OSC) material as a promoter are affixed. The three-way catalyst 32 has a higher $NO_x$ purification rate when the exhaust gas has a rich air-fuel ratio (A/F). When the three-way catalyst 32 is exposed to oxygen, the activity and $NO_x$ purification rate of the three-way catalyst 32 are lowered because the catalytic metal affixed to the three-way catalyst 32 oxidizes. The three-way catalyst 32 has the oxygen storage capacity function. A catalyst temperature sensor SW1 capable of detecting the temperature of the exhaust gas passing near the inlet of the three-way catalyst 32 is disposed upstream of the three-way catalyst 32. From the temperature detected by the catalyst temperature sensor SW1, the temperature of the three-way catalyst 32 can be estimated. The catalyst temperature sensor SW1 is one example of a "catalyst temperature detector" of the present disclosure. If the engine 1 does not include the three-way catalyst 32, the catalyst temperature sensor SW1 is disposed near the inlet of a filter 33 and can estimate the temperature of the filter 33.

In the exhaust passage 30, the filter 33 is disposed downstream of the three-way catalyst 32. An exhaust purification catalyst capable of collecting fine particulate substances such as soot in the exhaust gas and capable of burning the collected fine particulate substances is affixed to the filter 33. The body of the filter 33 is made of inorganic material such as cordierite, SiC, $Si_3N_4$, sialon, and $AlTiO_3$. The catalyst affixed to the filter 33 is a catalyst containing an OSC material, and may employ, for example, a catalyst containing activated alumina to which Pt is affixed; a mixture of a Zr-based composite oxide and a Rh-doped Ce-containing Zr-based composite oxide; and the like. The Ce-containing oxide can act as an OSC material. The OSC material generates adsorption heat by adsorbing $O_2$ if the air-fuel ratio of the exhaust gas is leaner than the stoichiometric air-fuel ratio, and generates oxidation heat by oxidizing HC and CO using the adsorbed $O_2$ if the air-fuel ratio of the exhaust gas is not lean. The filter 33 is a gasoline particulate filter (GPF), for example.

(Supply of Secondary Air)

The exhaust passage 30 is connected with a secondary air supply passage 40 between the three-way catalyst 32 and the filter 33. The secondary air supply passage 40 is supplied with secondary air from a secondary air supply device 41. The secondary air supply device 41 is, for example, an air pump that feeds outside air into the secondary air supply passage 40. The secondary air is not limited to the outside air, and may be air supplied from an intake passage or an exhaust passage provided with a branch passage. In the secondary air supply passage 40, a secondary air control valve 42 is disposed between the secondary air supply device 41 and the exhaust passage 30. The secondary air control valve 42 provides the periodicity to the secondary air supplied from the secondary air supply device 41. Specifically, the secondary air control valve 42 controls its own opening and closing, thereby periodically changing the flow rate of the secondary air. The secondary air is given an amplitude and a frequency by the secondary air control valve 42 and is periodically supplied to the exhaust passage 30. The amplitude referred to herein is the maximum concentration (%) of the oxygen of the introduced secondary air. Periodically supplying the secondary air to the exhaust passage 30 enables a reduction in the gas temperature T50 which is the gas temperature at the inlet of the exhaust purification catalyst when the HC purification rate and the CO purification rate reach 50%.

(Amplitude and Frequency of Secondary Air)

The amplitude and the frequency of the secondary air can be set to any amplitude and frequency by the secondary air control valve 42, and the amplitude and the frequency may be maintained at a constant period or may be varied. The exhaust purification catalyst generates adsorption heat by adsorbing $O_2$ if the air-fuel ratio of the exhaust gas is leaner than the stoichiometric air-fuel ratio, and generates oxidation heat by oxidizing HC and CO using the adsorbed $O_2$ if the air-fuel ratio of the exhaust gas is not lean. In this manner, the catalyst affixed to the filter is characterized by generating a cycle of the lean state and the non-lean state. The periodic secondary air enables generation of a cycle of the lean state and the non-lean state, thus supplying the secondary air enables generation of a cycle of the adsorption heat and the oxidation heat in the exhaust purification catalyst affixed to the filter. Accordingly, the temperature can be kept high and the combustion function can be promoted.

The amplitude of the secondary air is preferably less than or equal to 3% from the viewpoint of the energy efficiency with respect to the output of the air pump 41. Compared to when the secondary air is not supplied (when the amplitude is 0%), employing the amplitude of greater than 0.5% enables a decrease in the gas temperature (T50 (HC)) at the inlet of the catalyst when at least the HC purification rate reaches 50% and thus enables improvement in the HC purification performance. Employing the amplitude of greater than 0.66% enables decreases in T50 (HC) and T50 (CO) and thus enables improvement in the HC and CO purification performance. Employing the amplitude of greater than or equal to 0.70% enables a decrease in at least T50 (HC) by 5° C. or more and thus enables significant improvement in the HC purification performance. Employing the amplitude of greater than or equal to 0.78% and less than or equal to 1.8% enables decreases in T50 (HC) and T50 (CO) by 5° C. or more and thus enables significant improvement in the HC and CO purification performance.

When the secondary air employs the frequency within the predetermined range, the secondary air can be supplied in a cycle close to the cycle speed of the above adsorption and release of $O_2$ unique to the exhaust purification catalyst, and thus the catalytic reaction can be activated. The frequency is preferably less than or equal to 1.5 Hz. In comparison with when the secondary air is not supplied (the frequency of 0 Hz), employing the frequency of greater than 0 Hz enables a decrease in at least T50 (HC) and thus enables improvement in the HC purification performance. Employing the frequency of greater than or equal to 0.20 Hz and less than or equal to 0.94 Hz or the frequency of greater than or equal to 1.2 Hz and less than or equal to 1.25 Hz enables a decrease in at least T50 (HC) by 5° C. or more and thus enables significant improvement in the HC purification performance. Employing the frequency of greater than 0.25 Hz and less than 0.82 Hz enables decreases in T50 (HC) and T50 (CO) and thus enables improvement in the HC and CO purification performance.

(Control System)

Next, a control system of the exhaust purification device will be described with reference to FIG. 2. The engine system according to this embodiment is controlled by the engine control unit (ECU) 100 provided in the vehicle. The ECU 100 is a controller based on a well-known microcomputer, and includes a central processing unit (CPU) 101, a memory 102, and an intermediate frequency circuit (I/F circuit) 103. The CPU 101 executes programs. The memory 102 includes a random access memory (RAM) or a read only memory (ROM), for example, and stores programs and data. The I/F circuit 103 inputs and outputs electric signals. The ECU 100 is an example of the controller.

As shown in FIG. 2, the ECU 100 is electrically connected with the sensors SW1 to SW4. The sensors SW1 to SW4 output signals to the ECU 100. The sensors include the following sensors:

the catalyst temperature sensor SW1 disposed upstream of the three-way catalyst 32 in the exhaust passage 30 which detects the temperature of air flowing through the exhaust passage 30;

the accelerator position sensor SW2 attached to an accelerator pedal mechanism which detects the amount of depression of the accelerator pedal (the accelerator position);

the engine speed sensor SW3 attached to the engine 1 which detects the speed of the engine 1; and the throttle opening sensor SW4 attached to the throttle valve 23 which detects the opening degree of the throttle valve 23.

The ECU 100 determines the operating state of the engine 1 based on the signals from the sensors SW1 to SW4 and the like, and calculates the control amount of each device according to a control logic defined in advance. The control logic is stored in the memory 102. The control logic includes calculating the target amount and/or the control amount using a map stored in the memory 102.

The ECU 100 is electrically connected to devices such as the fuel injection valve 5, the intake S-VT 11, the exhaust S-VT 12, the throttle valve 23, the secondary air supply device 41, the secondary air control valve 42, and the like. The ECU 100 outputs the electric signal related to the calculated control amount to the fuel injection valve 5, the intake S-VT 11, the exhaust S-VT 12, the throttle valve 23, the secondary air supply device 41, the secondary air control valve 42, and the like.

(Control at Low Catalyst Temperature)

As a controller of the exhaust purification device, the ECU 100 supplies the secondary air to the exhaust purification catalyst in order to activate the exhaust purification catalyst when the temperature of the exhaust purification catalyst is low. Specifically, the ECU 100 determines whether the temperature detected by the catalyst temperature sensor SW1 is lower than or equal to a predetermined reference temperature stored in the memory 102. If the temperature is lower than or equal to the predetermined reference temperature, the ECU 100 outputs control signals to the secondary air supply device 41 and the secondary air control valve 42 in order to periodically supply the secondary air from the secondary air supply passage 40 to the exhaust passage 30. In this manner, periodically supplying the secondary air to the filter 33 enables generation of a cycle of the adsorption heat and the oxidation heat. Accordingly, the catalyst temperature can be kept high and the combustion function can be promoted. The predetermined reference temperature is a temperature at which the exhaust purification catalyst can exhibit the purification effects, and ranges of greater than or equal to 200° C. and less than or equal to 400° C., for example.

When the temperature of the exhaust purification catalyst is low, the ECU 100 preferably controls the fuel injection valve 5 or the like so that the air-fuel ratio in the combustion chamber 4 becomes slightly richer ($\lambda$<1) (e.g., A/F=about 14) than the stoichiometric air-fuel ratio (A/F=14.7) ($\lambda$=1). This allows a certain amount of fuel to flow into the three-way catalyst 32, and thus the catalytic reaction of the three-way catalyst 32 can continue and the temperature can be kept high. The air-fuel ratio is not limited the above air-fuel ratio, and the stoichiometric air-fuel ratio may be employed.

(Control in Fuel Cut for Deceleration)

In order to decelerate the engine 1, the ECU 100 as a controller of the exhaust purification device stops the supply of fuel to the combustion chamber 4; closes at least one of the intake valve 21 or the exhaust valve 31; and supplies the secondary air similarly to when the temperature of the catalyst is low. Specifically, if the predetermined condition of fuel cut for deceleration is satisfied while the engine 1 is decelerating, the ECU 100 controls the fuel injection valve 5 in order to stop the fuel supply to the combustion chamber 4 and execute the fuel cut for deceleration. The condition of fuel cut for deceleration is, for example, that the throttle opening sensor SW4 detects the throttle valve 23 being fully closed and that the engine speed sensor SW3 detects the speed of the engine 1 being higher than a predetermined speed (slightly higher than the idling speed). When the fuel cut for deceleration is executed, the ECU 100 transmits a control signal to at least one of the intake S-VT 11 or the exhaust S-VT 12 in order to close at least one of the intake S-VT 11 or the exhaust S-VT 12. When the fuel cut for deceleration is executed, the ECU 100 outputs control signals to the secondary air supply device 41 and the secondary air control valve 42 in order to periodically supply the secondary air from the secondary air supply passage 40 to the exhaust passage 30. In this manner, closing at least one of the intake valve 21 or the exhaust valve 31 when the fuel cut for deceleration is executed enables prevention of $O_2$ flowing from the combustion chamber into the three-way catalyst and enables prevention of catalytic metal being exposed to $O_2$ and then oxidizing; and supplying the secondary air to the filter 33 promotes the combustion of soot affixed to the filter.

Next, a control procedure of the exhaust purification device executed by the ECU 100 will be described with reference to FIG. 3. First, in step S1, the ECU 100 instructs the fuel injection valve 5 to inject fuel into the combustion chamber, and instructs the ignition device to ignite the fuel to start the engine 1.

In step S2, the ECU 100 determines whether the temperature detected by the catalyst temperature sensor SW1 is lower than or equal to a predetermined reference temperature stored in the memory 102. If the temperature detected by the catalyst temperature sensor SW1 is lower than or equal to the predetermined reference temperature (YES in step S2), the ECU 100 proceeds to step S3. If the temperature detected by the catalyst temperature sensor SW1 is not lower than or equal to the predetermined reference temperature (NO in step S2), the ECU 100 proceeds to step S4.

In step S3, the ECU 100 outputs control signals to the secondary air supply device 41 and the secondary air control valve 42 in order to periodically supply the secondary air from the secondary air supply passage 40 to the exhaust passage 30.

In step S4, the ECU 100 reads the information from the sensors, and proceeds to step S5 if the operation of the engine 1 is stopped. The ECU 100 continues to instruct the catalyst temperature sensor SW1 to monitor the catalyst temperature in step S2 if the engine 1 is operating.

In step S5, the ECU 100 outputs control signals to the secondary air supply device 41 and the secondary air control valve 42 in order to stop supplying the secondary air to the exhaust passage 30.

Figure 3:
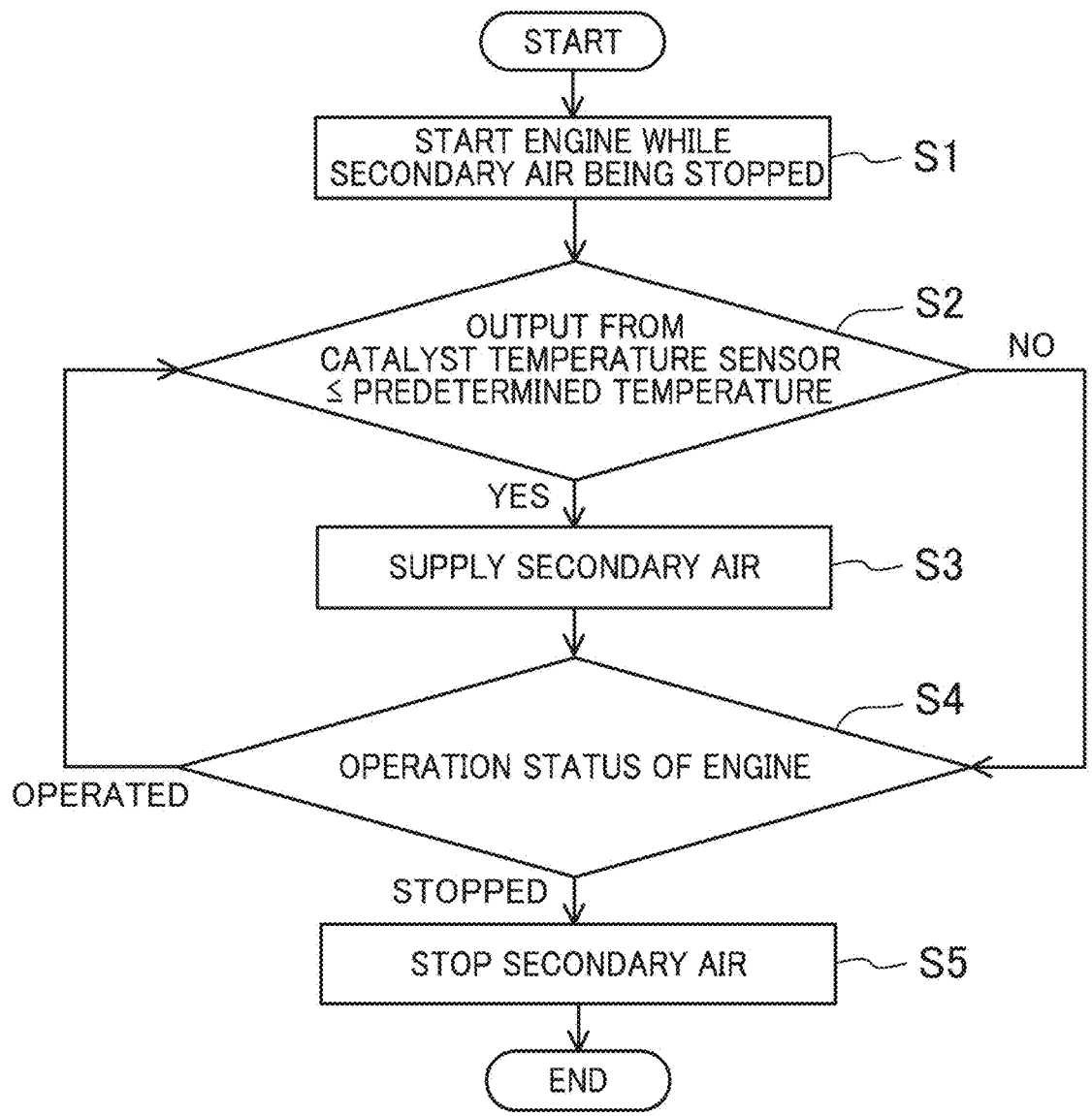
FIG. 3 is a flowchart of a control procedure of control of the exhaust purification device that is executed by an ECU.

According to the flow of FIG. 3, the ECU 100 activates the exhaust purification catalyst by supplying the secondary air to the exhaust purification catalyst when the temperature of the exhaust purification catalyst is low. This enables promotion of the combustion of soot in the filter and promotion of the purification of HC and CO.

Experimental Examples

Next, actual experimental examples will be described. The following experiment was conducted to verify that periodically supplying the secondary air to the exhaust purification catalyst enables improvement in the catalytic activity.

The exhaust purification catalyst containing a mixture of rhodium and palladium as precious metal particles; cerium-zirconium-based composite oxide and alumina as promoters; and zirconia as a binder was used. The material of the substrate was cordierite, and a flow-through-type substrate was used.

(Evaluation Conditions)

The base gas consists of 0.77% of O2; 0.9% of CO; 400 ppm of NO; 600 ppm of $C-C_3H_6$; 100 ppm of $C-C_2H_4$; 800 ppm of C-normal $C_8H_{18}$; and 10% of $H_2O$. The simulated gas for testing was obtained by adding $O_2$ to the base gas, where the concentration and frequency of $O_2$ were predetermined assuming the secondary air. The simulated gas was controlled so that the gas flows at a space velocity of 36,000 (1/h) and the temperature rises to 600° C. at a temperature rise rate of 30° C./min.

The gas temperatures (T50 (HC)) at the inlet of the catalyst when the HC purification rate reaches 50% and the gas temperatures (T50 (CO)) at the inlet of the catalyst when the CO purification rate reaches 50% are shown in FIGS. 4 to 7 and Tables 1 to 4.

TABLE 1

| Amplitude (O2 Concentration %) | HC-T50 (° C.) | CO-T50 (° C.) |
| --- | --- | --- |
| 0 | 196 | 180 |
| 0.3 | 193 | 180 |
| 1 | 180 | 168 |
| 2 | 187 | 177 |
| 3 | 187 | 177 |

TABLE 2

| Amplitude (O2 Concentration %) | HC-T50 (° C.) | CO-T50 (° C.) |
| --- | --- | --- |
| 0 | 196 | 180 |
| 0.5 | 196 | 185 |
| 1 | 181 | 168 |
| 2 | 184 | 174 |
| 3 | 188 | 177 |

TABLE 3

| Frequency (Hz) | HC-T50 (° C.) | CO-T50 (° C.) |
| --- | --- | --- |
| 0 | 196 | 179 |
| 0.125 | 193 | 181 |
| 0.25 | 180 | 168 |
| 0.5 | 181 | 168 |
| 1 | 192 | 179 |
| 1.5 | 188 | 180 |

TABLE 4

| Frequency (Hz) | HC-T50 (° C.) | CO-T50 (° C.) |
| --- | --- | --- |
| 0 | 196 | 179 |
| 0.25 | 189 | 179 |
| 0.5 | 184 | 174 |
| 1 | 190 | 181 |
| 1.5 | 192 | 182 |

(Evaluation Result 1)

Figure 4:
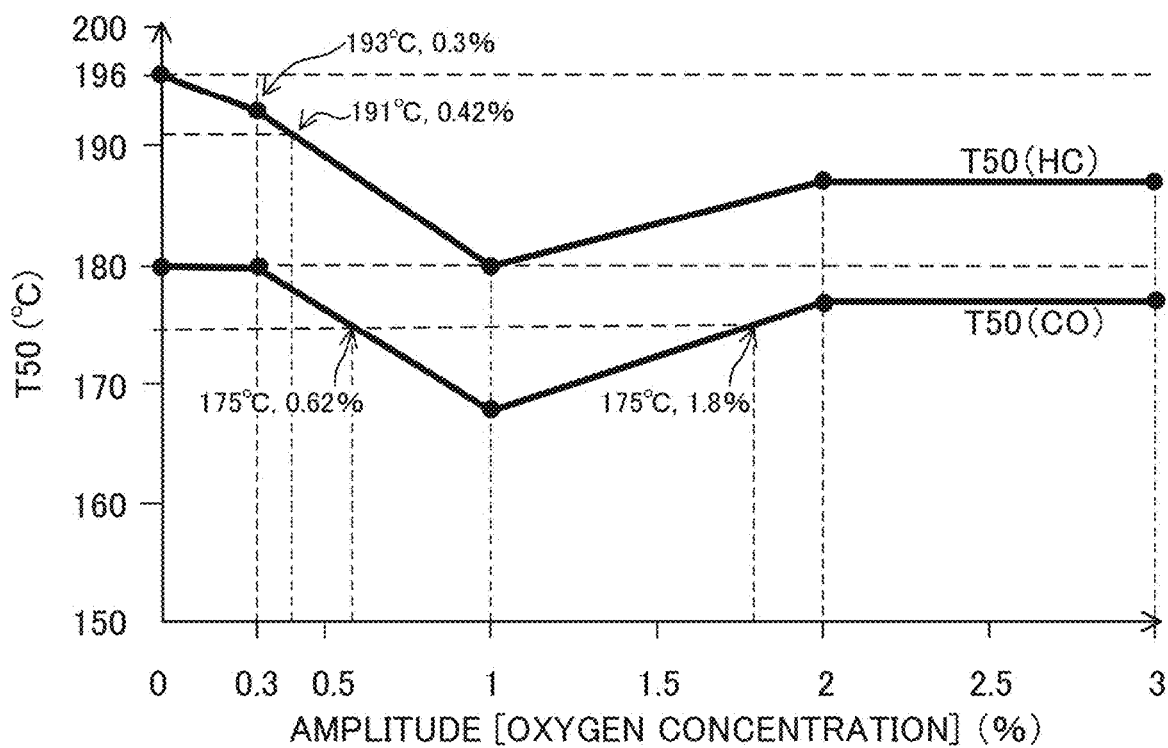
FIG. 4 is a graph showing T50 obtained when the frequency of the secondary air is fixed to a predetermined value and the maximum oxygen concentration is varied.

The result obtained when the frequency was fixed to 0.25 Hz and the amplitude was set to a predetermined value ranging from 0% to 3.0% are shown in FIG. 4 and Table 1. The graph and table show that when the amplitude was greater than 0% and less than or equal to 3%, T50 (HC) was lower than when the simulated gas was not supplied (or lower than T50 (HC) obtained when the amplitude was 0%), which means that the catalytic activity with respect to HC was improved. The graph and table also show that when the amplitude was greater than or equal to 0.42%, T50 (HC) was lower by 5° C. or more than when the simulated gas was not supplied (or lower than T50 (HC) obtained when the amplitude was 0%), which means that the activity was further improved within that range. The graph and table also show that when the amplitude was greater than 0.30% and less than or equal to 3.0%, T50 (CO) was lower than when the simulated gas was not supplied (or lower than T50 (CO) obtained when the amplitude was 0%), which means that the catalytic activity with respect to CO was improved. The graph and table also show that when the amplitude was greater than or equal to 0.62% and less than or equal to 1.8%, T50 (CO) was lower by 5° C. or more than when the simulated gas was not supplied (or lower than T50 (CO) obtained when the amplitude was 0%), which means that the activity was further improved within that range.

(Evaluation Result 2)

Figure 5:
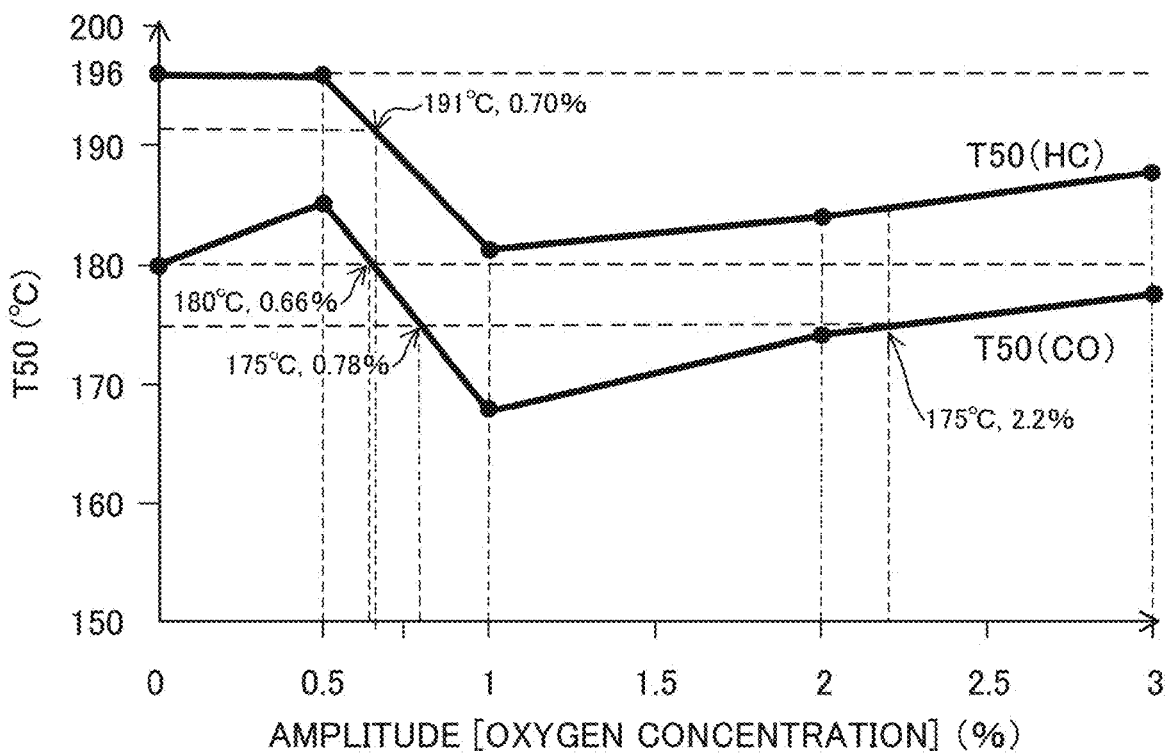
FIG. 5 is a graph showing T50 obtained when the frequency of the secondary air is fixed to a predetermined value and the maximum oxygen concentration is varied.

The result obtained when the frequency was fixed to 0.5 Hz and the amplitude was set to a predetermined value ranging from 0% to 3.0% are shown in FIG. 5 and Table 2. The graph and table show that when the amplitude was greater than 0.50% and less than or equal to 3.0%, T50 (HC) was lower than T50 (HC) obtained when the amplitude was 0%, which means that the catalytic activity with respect to HC was improved. The graph and table also show that when the amplitude was greater than or equal to 0.70%, T50 (HC) was lower by 5° C. or more than T50 (HC) obtained when the amplitude was 0%, which means that the activity was further improved within that range. The graph and table also show that when the amplitude was greater than 0.66% and less than or equal to 3.0%, T50 (CO) was lower than T50 (CO) obtained when the amplitude was 0%, which means that the catalytic activity with respect to CO was improved. The graph and table also show that when the amplitude was greater than or equal to 0.78% and less than or equal to 2.2%, T50 (CO) was lower by 5° C. or more than T50 (CO) obtained when the amplitude was 0%, which means that the activity was further improved within that range.

Evaluation Results 1 and 2 reveal more appropriate ranges of the amplitude of the secondary air. Employing the frequency fixed to a value of greater than 0 Hz and less than or equal to 1.5 Hz and the amplitude of greater than 0.50% enables a decrease in at least T50 (HC). Employing the amplitude of greater than 0.66% enables decreases in both T50 (HC) and T50 (CO). Employing the amplitude of greater than or equal to 0.7% enables a decrease in T50 (HC) by 5° C. or more and thus enables significant improvement in the HC purification performance. Employing the amplitude of greater than or equal to 0.78% and less than or equal to 1.8% enables decreases in T50 (HC) and T50 (CO) by 5° C. or more and thus enables significant improvement in the HC and CO purification performance.

(Evaluation Result 3)

Figure 6:
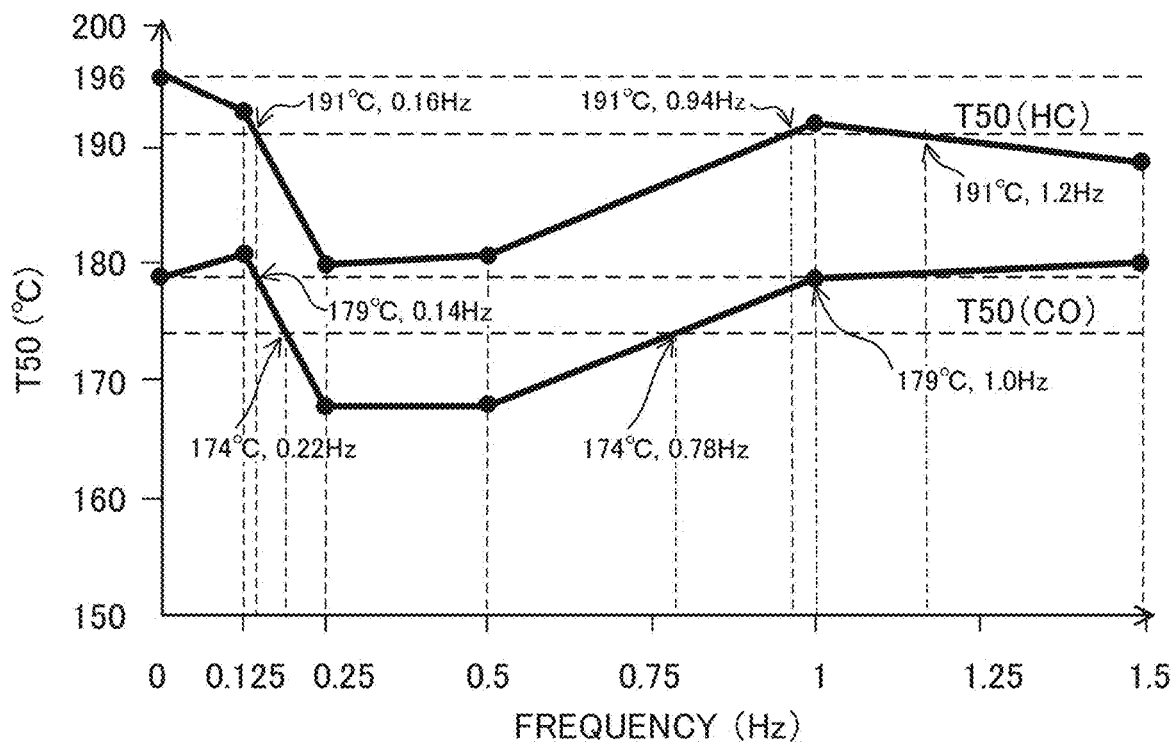
FIG. 6 is a graph showing T50 obtained when the maximum oxygen concentration of the secondary air is fixed to a predetermined value and the frequency is varied.

The result obtained when the amplitude was fixed to 1.0% and the frequency was set to a predetermined value ranging from 0 Hz to 1.5 Hz are shown in FIG. 6 and Table 3. The graph and table show that when the frequency was greater than 0 Hz and less than or equal to 1.5 Hz, T50 (HC) was lower than T50 (HC) obtained when the frequency was 0 Hz, which means that the catalytic activity with respect to HC was improved. The graph and table also show that when the frequency was greater than or equal to 0.16 Hz and less than or equal to 0.94 Hz or when the frequency was greater than or equal to 1.2 Hz and less than or equal to 1.5 Hz, T50 (HC) was lower by 5° C. or more than T50 (HC) obtained when the frequency was 0 Hz, which means that the activity was further improved within that range. The graph and table also show that when the frequency was greater than 0.15 Hz and less than or equal to 1.0 Hz, T50 (CO) was lower than T50 (CO) obtained when the frequency was 0 Hz, which means that the catalytic activity with respect to CO was improved. The graph and table also show that when the frequency was greater than or equal to 0.22 Hz and less than or equal to 0.78 Hz, T50 (CO) was lower by 5° C. or more than T50 (CO) obtained when the frequency was 0 Hz, which means that the activity was further improved within that range.

(Evaluation Result 4)

Figure 7:
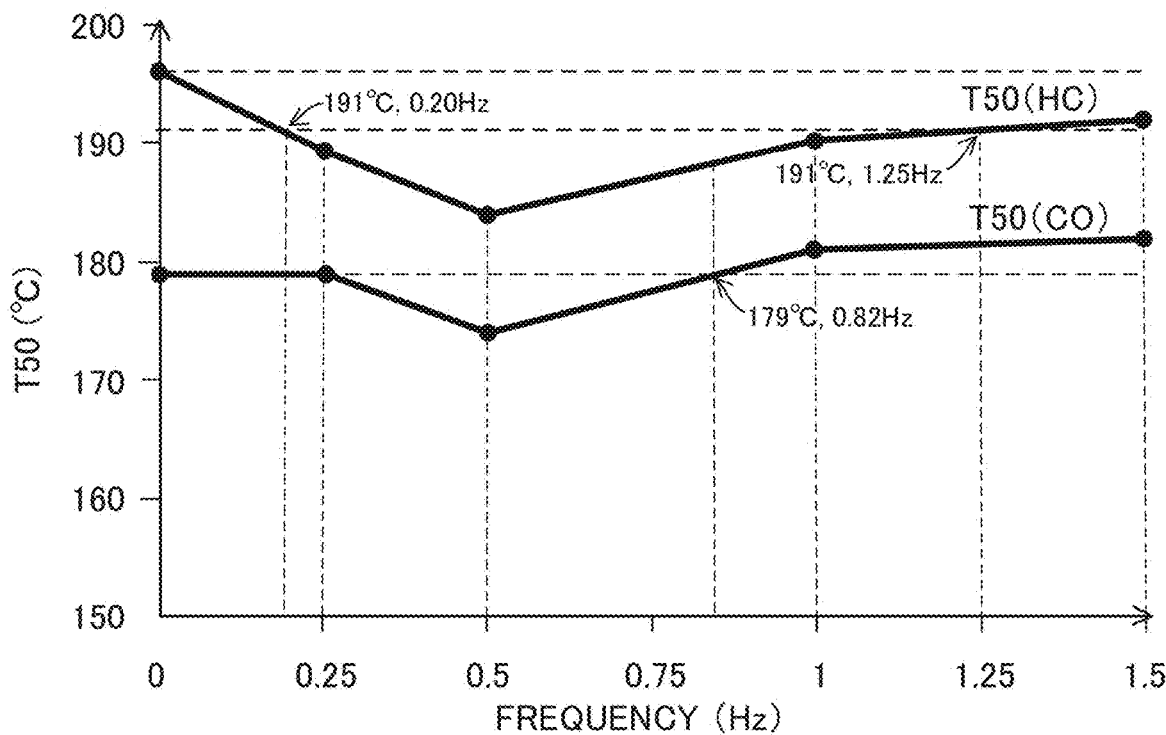
FIG. 7 is a graph showing T50 obtained when the maximum oxygen concentration of the secondary air is fixed to a predetermined value and the frequency is varied.

The result obtained when the amplitude was fixed to 2.0% and the frequency was set to a predetermined value ranging from 0 Hz to 1.5 Hz are shown in FIG. 7 and Table 4. The graph and table show that when the frequency was greater than 0 Hz and less than or equal to 1.5 Hz, T50 (HC) was lower than T50 (HC) obtained when the frequency was 0 Hz, which means that the catalytic activity with respect to HC was improved. The graph and table also show that when the frequency was greater than or equal to 0.20 Hz and less than or equal to 1.25 Hz, T50 (HC) was lower by 5° C. or more than T50 (HC) obtained when the frequency was 0 Hz, which means that the activity was further improved within that range. The graph and table also show that when the frequency was greater than 0.25 Hz and less than or equal to 0.82 Hz, T50 (CO) was lower than T50 (CO) obtained when the frequency was 0 Hz, which means that the catalytic activity with respect to CO was improved.

Evaluation Results 3 and 4 reveal more appropriate ranges of the frequency of the secondary air. Employing the amplitude fixed to a value of greater than 0% and less than or equal to 3.0% and the frequency of greater than 0 Hz and thus enables improvement in the HC purification performance. Employing the frequency of greater than or equal to 0.20 Hz and less than 0.94 Hz or the frequency of greater than or equal to 1.2 Hz and less than or equal to 1.25 Hz enables a decrease in at least T50 (HC) by 5° C. or more and thus enables significant improvement in the HC purification performance. Employing the frequency of greater than or equal to 0.25 Hz and less than 0.82 Hz enables a decrease in T50 (HC) by 5° C. or more as well as a decrease in T50 (CO) and thus enables improvement in the HC and CO purification performance.

What is claimed is:

1. An exhaust purification device comprising:
   an exhaust passage connected to a combustion chamber of an engine;
   a filter which is disposed in the exhaust passage, which is capable of collecting fine particles in exhaust gas, and to which a catalyst including an oxygen storage capacity (OSC) material is affixed;
   a secondary air supply passage connected to the exhaust passage upstream of the filter;
   a secondary air supply device configured to supply secondary air to the secondary air supply passage;
   a secondary air control valve disposed in the secondary air supply passage and configured to provide the secondary air with periodicity; and
   a controller electrically connected with the secondary air control valve, wherein the controller:

controls the secondary air control valve so as to supply the secondary air with a predetermined frequency and a predetermined maximum amplitude of an oxygen concentration, and controls the secondary air control valve so that when the frequency of the secondary air is fixed to a value of greater than 0 Hz and less than or equal to 1.5 Hz, the maximum amplitude of the oxygen concentration is greater than 0.50% and less than or equal to 3.0%.

2. The exhaust purification device of claim 1, wherein the secondary air control valve is controlled so that when the frequency of the secondary air is fixed to a value of greater than 0 Hz and less than or equal to 0.5 Hz, the maximum amplitude of the oxygen concentration is greater than 0.50% and less than or equal to 3.0%.

3. The exhaust purification device of claim 1, wherein the secondary air control valve is controlled so that the maximum amplitude of the oxygen concentration of the secondary air is greater than 0.66% and less than or equal to 3.0%.

4. The exhaust purification device of claim 3, wherein the secondary air control valve is controlled so that the maximum amplitude of the oxygen concentration of the secondary air is greater than or equal to 0.78% and less than or equal to 1.8%.

5. An exhaust purification device comprising:
   an exhaust passage attached to a combustion chamber of an engine;
   a filter which is disposed in the exhaust passage, which is capable of collecting fine particles in exhaust gas, and to which a catalyst including an oxygen storage capacity (OSC) material is affixed;
   a secondary air supply passage connected to the exhaust passage upstream of the filter;
   a secondary air supply device configured to supply secondary air to the secondary air supply passage;
   a secondary air control valve disposed in the secondary air supply passage and configured to provide the secondary air with periodicity; and
   a controller electrically connected with the secondary air control valve, wherein the controller:
      controls the secondary air control valve so as to supply the secondary air with a predetermined frequency and a predetermined maximum amplitude of an oxygen concentration, and
      controls the secondary air control valve so that when the maximum amplitude of the oxygen concentration of the secondary air is fixed to a value of greater than 0% and less than or equal to 3.0%, the frequency is greater than 0 Hz and less than or equal to 1.5 Hz.

6. The exhaust purification device of claim 5, wherein the secondary air control valve is controlled so that the frequency of the secondary air is greater than or equal to 0.20 Hz and less than or equal to 0.94 Hz, or greater than or equal to 1.2 Hz and less than or equal to 1.25 Hz.

7. The exhaust purification device of claim 5, wherein the secondary air control valve is controlled so that the frequency of the secondary air is greater than 0.25 Hz and less than 0.82 Hz.

8. The exhaust purification device of claim 1, further comprising:
   a temperature detector configured to detect a temperature of the filter, wherein
   the controller:
      is electrically connected to the temperature detector;
      determines whether the temperature detected by the temperature detector is lower than or equal to a predetermined reference temperature; and
      controls the secondary air control valve to periodically supply the secondary air if the temperature detected by the temperature detector is lower than or equal to the reference temperature.

9. The exhaust purification device of claim 8, further comprising:
   a three-way catalyst disposed in the exhaust passage, wherein
   the filter is disposed in the exhaust passage downstream of the three-way catalyst, and
   the secondary air supply passage is connected to the exhaust passage between the three-way catalyst and the filter.

10. The exhaust purification device of claim 9, further comprising:
    a fuel injection valve configured to supply fuel to the combustion chamber, wherein
    when controlling the secondary air control valve to supply the secondary air, the controller controls the fuel injection valve so that an air-fuel ratio in the combustion chamber is richer than a stoichiometric air-fuel ratio.

11. The exhaust purification device of claim 5, further comprising:
    a temperature detector configured to detect a temperature of the filter, wherein
    the controller:
       is electrically connected to the temperature detector;
       determines whether the temperature detected by the temperature detector is lower than or equal to a predetermined reference temperature; and
       controls the secondary air control valve to periodically supply the secondary air if the temperature detected by the temperature detector is lower than or equal to the reference temperature.

* * * * *